United States Patent
Meszaros et al.

(10) Patent No.: US 10,814,790 B2
(45) Date of Patent: Oct. 27, 2020

(54) RUNNING BOARD WITH ROOF ACCESS STEP AND METHOD

(71) Applicant: Ford Global Technologies, LLC, Dearborn, MI (US)

(72) Inventors: Edward Joseph Leonard Meszaros, Amherstburg (CA); David Thomas Patrick, Canton, MI (US); Mark Beilman, South Lyon, MI (US); Scott Stinson, Livonia, MI (US); Stephen Kowal, Allen Park, MI (US); Andre Kunynetz, LaSalle (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 59 days.

(21) Appl. No.: 16/018,224

(22) Filed: Jun. 26, 2018

(65) Prior Publication Data

US 2019/0389386 A1 Dec. 26, 2019

(51) Int. Cl.
*B60R 3/00* (2006.01)
*B60R 3/02* (2006.01)

(52) U.S. Cl.
CPC .............. *B60R 3/002* (2013.01); *B60R 3/005* (2013.01); *B60R 3/02* (2013.01)

(58) Field of Classification Search
CPC ............ B60R 3/02; B60R 3/002; B60R 3/005
See application file for complete search history.

(56) References Cited

U.S. PATENT DOCUMENTS

| | | | |
|---|---|---|---|
| 5,039,119 A | 8/1991 | Baughman | |
| 5,697,626 A | 12/1997 | McDaniel et al. | |
| 6,135,472 A * | 10/2000 | Wilson | B60R 3/002 280/164.1 |
| 7,025,365 B2 | 4/2006 | Bang et al. | |
| 7,377,531 B2 | 5/2008 | Fabiano et al. | |
| 7,413,205 B2 * | 8/2008 | Watson | B60R 3/02 280/163 |
| 7,448,637 B2 * | 11/2008 | Parker | B60R 3/02 182/88 |
| 9,539,948 B1 * | 1/2017 | Presley | B60R 3/02 |
| 9,586,527 B1 * | 3/2017 | Salter | B60R 3/02 |
| 9,821,717 B1 * | 11/2017 | Dellock | B60Q 1/2661 |
| 2002/0070577 A1 * | 6/2002 | Pool, III | B60R 3/02 296/62 |
| 2005/0036867 A1 | 2/2005 | Dyck | |
| 2005/0179226 A1 * | 8/2005 | Kolpasky | B60R 3/002 280/163 |
| 2006/0175791 A1 * | 8/2006 | Kaempe | B60R 3/002 280/166 |
| 2007/0221442 A1 | 9/2007 | R.C. | |

(Continued)

*Primary Examiner* — Erez Gurari
(74) *Attorney, Agent, or Firm* — David Coppiellie; Carlson, Gaskey & Olds, P.C.

(57) ABSTRACT

This disclosure relates to a running board for a motor vehicle, and in particular relates to a running board with a roof access step and a corresponding method of using the same. An example running board includes a deck having a first section and a second section. The first section is configured to move between a first position in which the first section is substantially flush with the second section, and a second position in which the first section is raised relative to the second section. In the second position, the first section of the deck provides a roof access step.

18 Claims, 8 Drawing Sheets

(56) References Cited

U.S. PATENT DOCUMENTS

| | | | |
|---|---|---|---|
| 2011/0280700 A1 | 11/2011 | Uttech et al. | |
| 2012/0104719 A1* | 5/2012 | Hayes | B60R 3/02 |
| | | | 280/163 |
| 2016/0075286 A1* | 3/2016 | Butlin, Jr. | B60R 3/02 |
| | | | 296/62 |
| 2016/0288718 A1* | 10/2016 | Hayes | B60R 3/02 |
| 2017/0274828 A1* | 9/2017 | Woodhouse | B60R 3/02 |
| 2019/0047477 A1* | 2/2019 | Crandall | B60Q 1/323 |
| 2019/0389386 A1* | 12/2019 | Meszaros | B60R 3/005 |

* cited by examiner

RUNNING BOARD WITH ROOF ACCESS STEP AND METHOD

TECHNICAL FIELD

This disclosure relates to a running board for a motor vehicle, and in particular relates to a running board with a roof access step and a corresponding method of using the same.

BACKGROUND

Sport utility vehicles (SUVs), trucks, pickup trucks, vans, and other vehicles, such as four wheel drive (4WD) vehicles, have a relatively high ground clearance, meaning the floor is at a relatively high elevation above the ground.

Running boards are known and are sometimes used by users when accessing items stored on the roof of the vehicle. Some retractable running board assemblies (sometimes referred to as power running board assemblies or electric running board assemblies) include a running board that is pivotally connected the vehicle by one or more linkages. The linkages are driven by an actuator. Together, the linkages and actuator are configured to move the running board between a retracted position (sometimes referred to as a "stowed" position) and a deployed position.

SUMMARY

A running board for a motor vehicle according to an exemplary aspect of the present disclosure includes, among other things, a deck including a first section and a second section. The first section is configured to move between a first position in which the first section is substantially flush with the second section, and a second position in which the first section is raised relative to the second section.

In a further non-limiting embodiment of the foregoing running board, when in the second position, the first section is both raised and displaced rearward relative to the first section.

In a further non-limiting embodiment of any of the foregoing running boards, the first section is configured to rotate between the first position and the second position.

In a further non-limiting embodiment of any of the foregoing running boards, first section is coupled to the second section by way of at least one link.

In a further non-limiting embodiment of any of the foregoing running boards, the first section is coupled to the first section by way of at least one first link and at least one second link spaced apart from the at least one first link along a length of the running board, and the at least one first link and the at least one second link are rotatably connected to the first and second sections.

In a further non-limiting embodiment of any of the foregoing running boards, the at least one second link includes two links spaced-apart from one another in a direction normal to the length of the running board such that, when the first section is in the first position, the at least one first link is nested between the two second links.

In a further non-limiting embodiment of any of the foregoing running boards, the first section includes a support assembly configured to support the first section in the second position.

In a further non-limiting embodiment of any of the foregoing running boards, when the first section is in the second position, the support assembly is selectively deployable to engage a tire of the motor vehicle.

In a further non-limiting embodiment of any of the foregoing running boards, the first section includes a step and a brace configured to fold relative to the step, and when folded, the brace is configured to engage a sidewall of the tire.

In a further non-limiting embodiment of any of the foregoing running boards, the first section includes a pin slidable to engage a circumferentially outer wall (i.e., the tread) of the tire.

In a further non-limiting embodiment of any of the foregoing running boards, the pin is accessible when the brace is folded.

In a further non-limiting embodiment of any of the foregoing running boards, when the brace is folded, a handle coupled to the pin projects from the step.

In a further non-limiting embodiment of any of the foregoing running boards, a cavity formed in the running board receives the first section when the first section is in the first position, and an assistance step is selectively deployable out of the cavity to provide a step adjacent the cavity.

In a further non-limiting embodiment of any of the foregoing running boards, the assistance step is slidable between a storage position and an intermediate position, and the assistance step is rotatable from the intermediate position to a use position.

A method according to an exemplary aspect of the present disclosure includes, among other things, raising a first section of a deck of a running board relative to a second section of the deck. The raising step includes moving the first section from a first position in which the first section is substantially flush with the second section, to a second position in which the first section is raised relative to the second section.

In a further non-limiting embodiment of the foregoing method, the running board is moveable between a retracted position, a first deployed position, and a second deployed position, the running board is displaced further from a body of a vehicle in the second deployed position than in the first deployed position, and the raising step is performed when the running board is in the second deployed position.

In a further non-limiting embodiment of any of the foregoing methods, the method includes supporting the first section in the second position by engaging a tire of a vehicle.

In a further non-limiting embodiment of any of the foregoing methods, the method includes folding a brace of the first section, the brace engaging a side wall of the tire, deploying a pin upon folding the brace, and sliding the pin to engage a circumferentially outer surface of the tire.

In a further non-limiting embodiment of any of the foregoing methods, the method includes deploying an assistance step out of a cavity formed in the running board when the first section is in the second position.

In a further non-limiting embodiment of any of the foregoing methods, the raising step further includes rotating the first section, such that the first section is displaced both vertically and rearward during the raising step.

BRIEF DESCRIPTION OF THE DRAWINGS

FIGS. 6-9 are close-up perspective views of the running board assembly, and illustrate an example sequence in which the support assembly is deployed relative to the tire of the vehicle.

FIGS. 10-12 are perspective views of the running board assembly and illustrate an example sequence in which an assistance step is deployed.

DETAILED DESCRIPTION

This disclosure relates to a running board for a motor vehicle, and in particular relates to a running board with a roof access step and a corresponding method of using the same. An example running board includes a deck having a first section and a second section. The first section is configured to move between a first position in which the first section is substantially flush with the second section, and a second position in which the first section is raised relative to the second section. In the second position, the first section of the deck provides a roof access step.

Among other benefits, the first section of the deck is configured to support a user above the remainder of the running board, and thus allows the user to more easily access the roof of the vehicle where items such as luggage, canoes, bicycles, skis, etc., may be stored. Further, because the roof access step is provided by a section of the running board's deck, the roof access step is readily available for use and is unlikely to be stolen or lost. These and other benefits will be appreciated from the below description.

Figure 1:
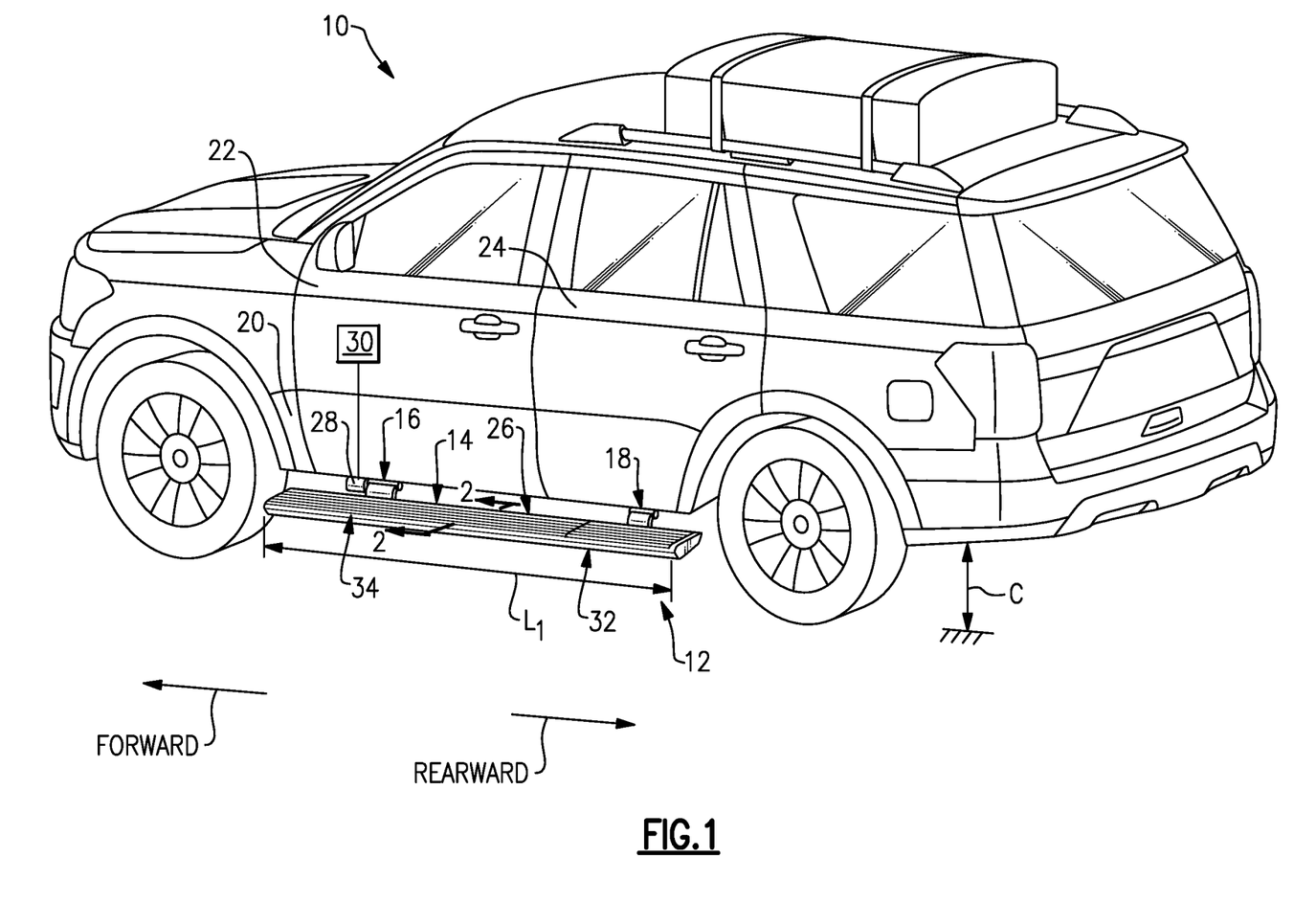
FIG. 1 is a perspective view of a motor vehicle with an example running board assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a sport utility vehicle (SUV). While an SUV is pictured, this disclosure is also applicable to other types of vehicles having a high ground clearance, such as vans and trucks.

The vehicle 10 includes a retractable running board assembly 12 moveable from a retracted position to at least one deployed position. The running board assembly 12 is shown in a deployed position in FIG. 1. In this example, the retractable running board assembly 12 includes a running board 14 and first and second linkages 16, 18 rotatably connecting the running board 14 to a vehicle body 20, which includes the frame and paneling of the vehicle 10.

The running board 14 has a length $L_1$ that extends in a direction parallel to the "forward" and "rearward" directions, which are labeled in FIG. 1 and correspond to the normal "forward" and "rearward" orientations of the vehicle 10. The running board 14 in this example spans at least a majority of the widths of a front door 22 and a rear door 24 of the vehicle 10. While only one running board 14 is shown in FIG. 1, it should be understood that a similar running board may be provided on an opposite side of the vehicle 10.

When in a deployed position, a user may step on the running board 14 as they enter and exit the vehicle 10. Specifically, the user may step on a deck 26 (or, step pad or stepping platform) of the running board 14, which in this example provides the uppermost surface of the running board 14.

In this example, the first linkage 16 is directly coupled to a motor 28, which is configured to move the running board 14 between the retracted and deployed positions. In one example, the motor 28 is in communication with a controller 30, which instructs the motor 28 to move the running board 14 between the retracted and deployed positions based on whether the doors 22, 24 are opened or closed, for example.

The controller 30 is shown schematically in FIG. 1. It should be understood that the controller 30 could be part of an overall vehicle control module, such as a vehicle system controller (VSC), or could alternatively be a stand-alone controller separate from the VSC. Further, the controller 30 may be programmed with executable instructions for interfacing with and operating the various components of the vehicle 10. The controller 30 may be operable in response to signals from a key fob, a vehicle infotainment system, or a mobile device of a user, for example. The controller 30 additionally includes a processing unit and non-transitory memory for executing the various control strategies and modes of the vehicle system.

In one example, the motor 28 is an electric motor, and is responsive to instructions from the controller 30 to selectively to adjust a position of the first linkage 16. The second linkage 18 is configured to move in response to movement of the first linkage 16. In other words, the second linkage 18 is a follower linkage. In another example, however, the second linkage 18 could be directly coupled to the motor 28 and the first linkage 16 could be a follower linkage. Further, while two linkages 16, 18 are illustrated in FIG. 1, this disclosure extends to retractable running board assemblies having one or more linkages.

Figure 2:
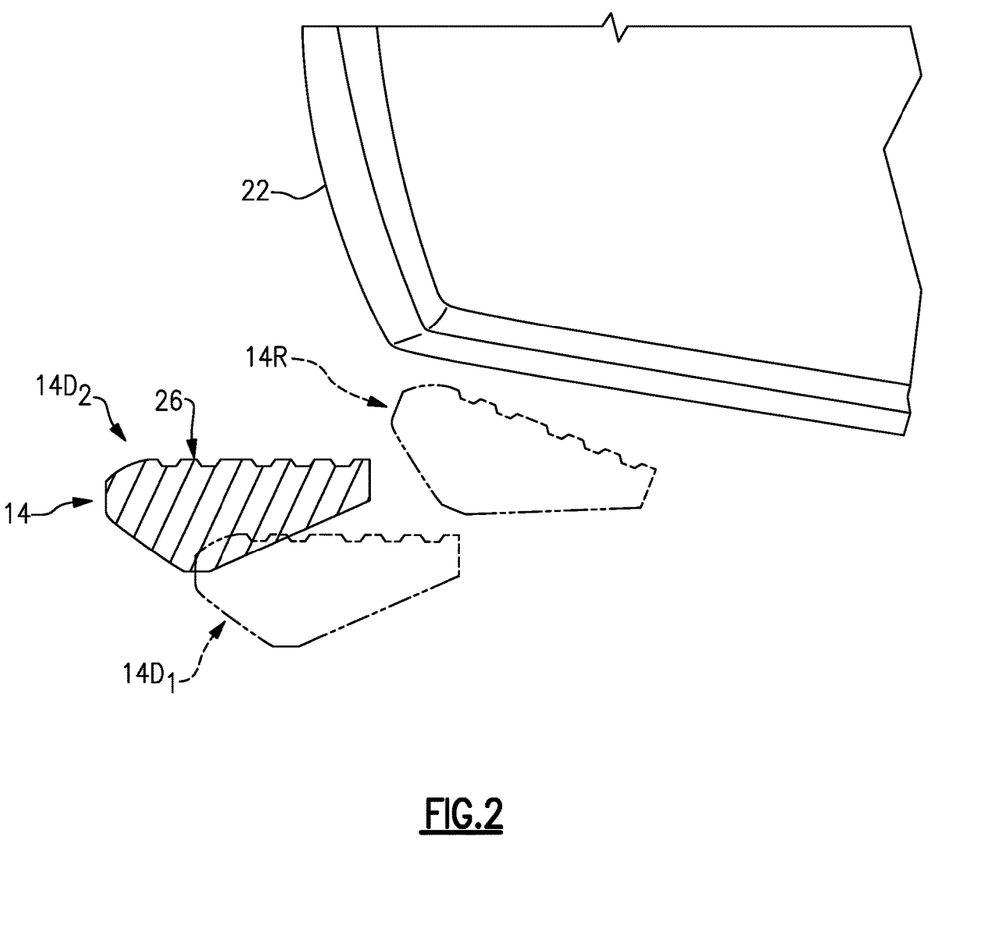
FIG. 2 is a cross-sectional view taken along line 2-2 and illustrates the running board in three example positions.

FIG. 2 is a somewhat schematic cross-sectional view of the running board 14 taken along line 2-2 and illustrates three example operational positions of the running board 14 relative to the door 22. As shown in FIG. 2, the motor 28 and the linkages 16, 18 are configured to move the running board 14 between a retracted position 14R (shown in phantom), a first deployed position $14D_1$, and a second deployed position $14D_2$. In the retracted position 14R, the running board 14 is essentially tucked under a lower surface of the door 22 to protect the running board 14 while the vehicle 10 is in motion, for example. When the vehicle 10 is stationary, the motor 28 is configured to drive the linkages 16, 18 under instructions from the controller 30 to one of the deployed positions $14D_1$, $14D_2$. In the first and second deployed positions $14D_1$, $14D_2$, the deck 26 of the running board 14 is substantially parallel to a ground surface. Thus, the running board 14 may support a user in both the first and second deployed positions $14D_1$, $14D_2$. In the second deployed position $14D_2$, however, the running board 14 displaced further laterally (i.e., to the left-hand side, relative to FIG. 2) from a body of a vehicle 10, and in particular from the door 22, than in the first deployed position $14D_1$. As will be appreciated from the below, the second deployed position $14D_2$ may facilitate deployment of a roof access step.

The first deployed position $14D_1$ may be employed during normal use of the running board 14. For example, as a user opens and closes the doors 22, 24, the running board 14 may move between the retracted position 14R and the first deployed position 14D₁. A separate command may instruct the controller 30 to cause the running board 14 to move to the second deployed position 14D₂. That command may come from a key fob, a keypad on the door 22 (for example), a mobile device of a user (i.e., using the phone as a key, sometimes abbreviated PAAK), or a button within the vehicle 10. The command will typically be initiated by the user when the user intends to deploy a roof access step (discussed below), and thus needs the running board 14 to be displaced further from a side of the vehicle 10.

While a three-position (i.e., retracted/stowed, first deployed, and second deployed positions) running board assembly is shown in the figures, it should be understood that this disclosure extends to retractable running board assemblies that are moveable to another number of positions (e.g., two position running board assemblies). Further, it should be understood that this disclosure extends to running board assemblies that are not retractable (i.e., single, deployed position only).

With reference back to FIG. 1, the deck 26 includes a first section 32 and a second section 34. In this example, the first section 32 is moveable relative to the second section 34 between a first position and a second position in order to provide a roof access step. In this example, the first section 32 is adjacent a rear section of the running board 14. Further, in this example, the deck 26 only includes two sections. That is, the first section 32 is moveable relative to the remainder of the deck 26, which is provided by the second section 34.

In FIG. 1, the first section 32 of the deck 26 is in the first position, in which the first section 32 is substantially flush with the second section 34. In particular, in the first position, the upper surfaces of the first and second sections 32, 34 lie in substantially the same plane to provide a substantially continuous, uninterrupted deck to support a user's feet as they enter and exit the vehicle 10.

Figure 3:
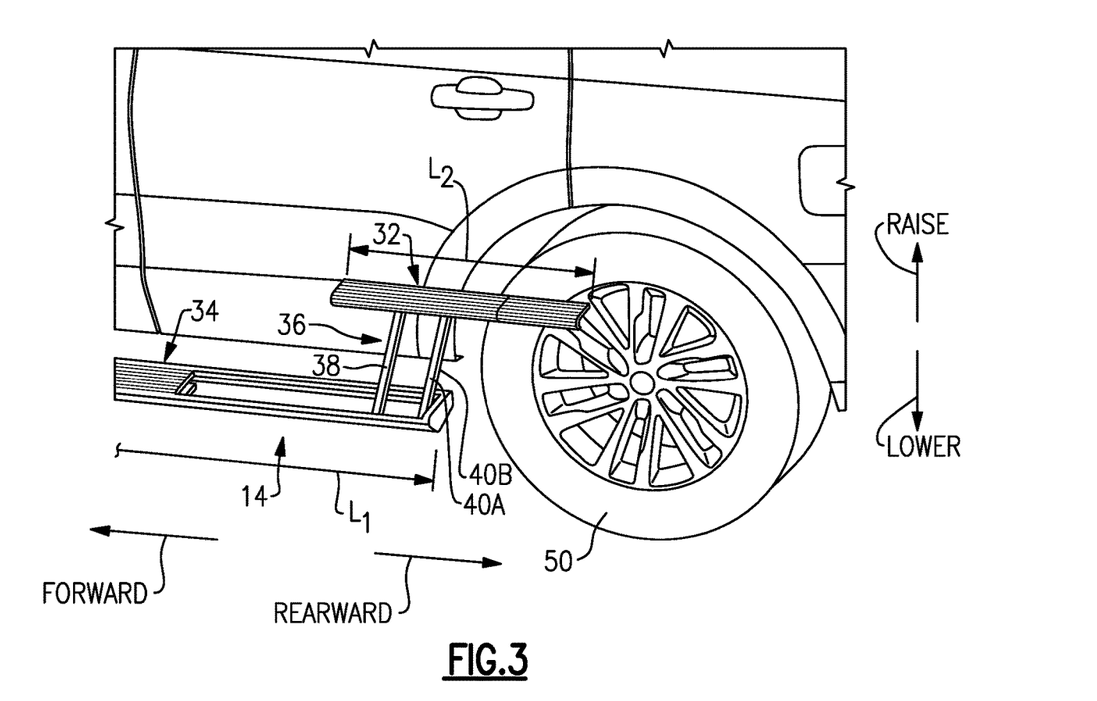
FIG. 3 is a side-perspective view of the example running board assembly with a first section of the deck raised relative to a second section of the deck.

FIG. 3 illustrates the first section 32 in a second position in which the first section 32 is raised relative to the second section 34. In particular, in the second position, the first section is both raised and displaced rearward relative to the first section. The "raise" and "lower" directions are labeled in FIG. 3 for reference, and are used with reference to the normal operational orientation of the vehicle 10.

In this disclosure, the first section 32 may be rotated between the first and second positions manually by a user. To this end, the first section 32 may include a handle or grip to facilitate a user's grasping of the first section 32 independent of the remainder of the running board 14. This disclosure is not limited to manual manipulation of the first section 32, and the first section 32 may be moveable automatically by a dedicated mechanism in other examples.

The first section 32 is mechanically coupled to the remainder of the running board 14 by way of a linkage arrangement 36. The linkage arrangement 36 includes at least one link, which is configured to allow rotation of the first section 32 relative to the second section 34 and is sufficient to support the weight of a user when a user steps on an upper surface of the first section 32, for example. In this example, the links of the linkage arrangement 36 are rotatable through an angle of rotation greater than 90°. In this way, a downward force on the first section 32 tends to cause the first section 32 to rotate in a clockwise direction (relative to FIG. 3), but, as discussed below, such rotation is limited by a support assembly.

Figure 4:
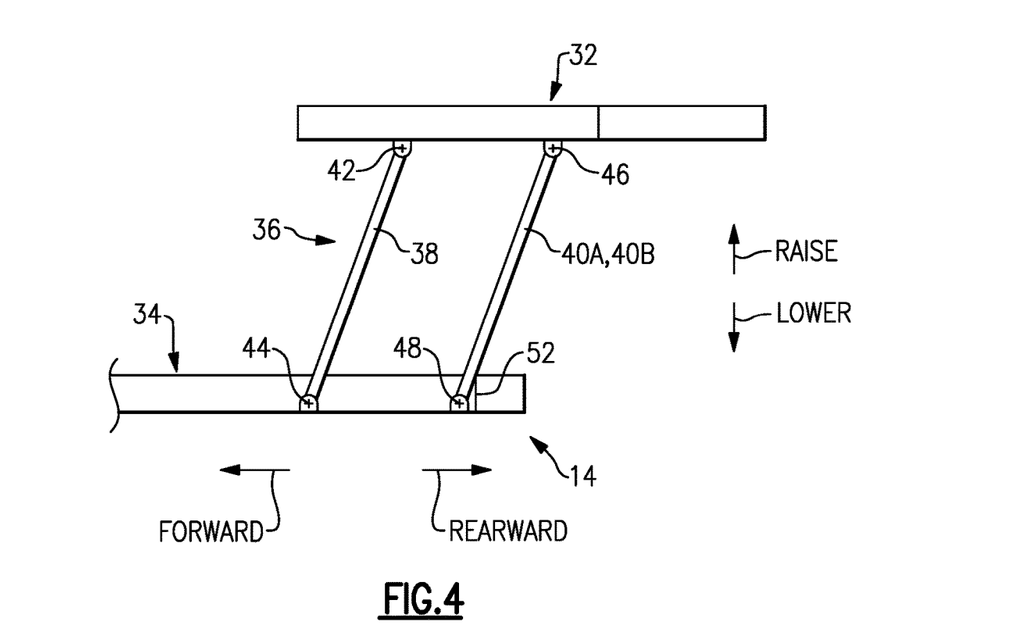
FIG. 4 is a somewhat schematic view of the example running board assembly, an in particular illustrates the linkage arrangement between the first and second sections of the deck.

With reference to FIGS. 3 and 4, the first section 32 is coupled to the first section by way a first link 38 and two second links 40A, 40B, the latter of which are spaced-apart from the first link 38 along a length $L_1$ of the running board (i.e., into the page, relative to FIGS. 3 and 4). While there is one first link 38 and two second links 40A, 40B in this example, this disclosure extends to other linkage arrangements including a different number and arrangement of links.

The connection between the first section 32, the second section 34, and the linkage arrangement 36 behaves as a four bar linkage in this example. In particular, a first end of the first link 38 is rotatably coupled to the first section 32 at a first pivot point 42 and a second, opposite end of the first link 38 is rotatably coupled to the second section 34 at a second pivot point 44. Further, first ends of the second links 40A, 40B are rotatably coupled to the first section 32 at first pivot points 46 (only one of which is shown in FIG. 4 for simplicity) and second, opposite ends of the second links 40A, 40B are rotatably coupled to the second section 34 at second pivot points 48.

Figure 5:
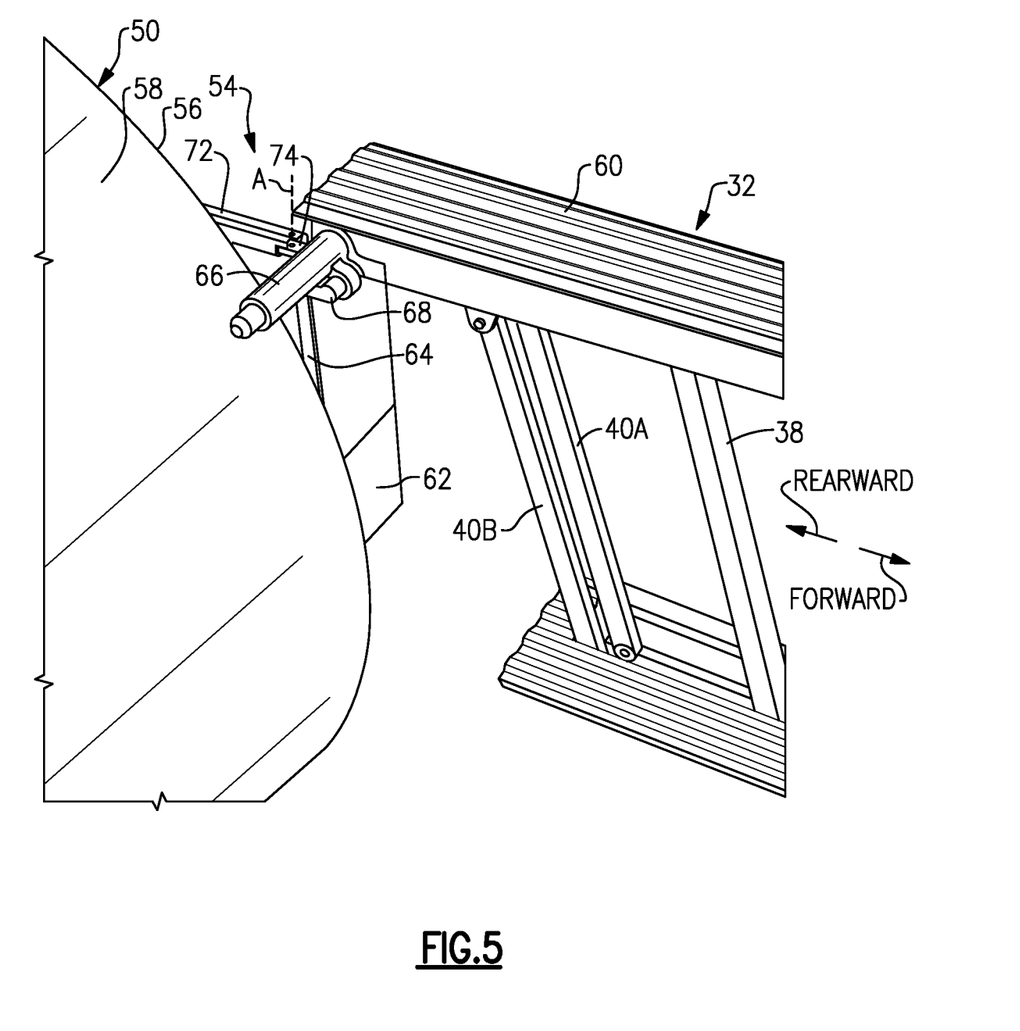
FIG. 5 is an interior-perspective view illustrating the support assembly relative to a tire of a vehicle.

In this example, as perhaps best seen in FIG. 3 or 5, the second links 40A, 40B are spaced-apart from one another in a direction normal to the length $L_1$ of the running board 14. The gap between the second links 40A, 40B is sized such that, when the first section 32 is in the first position, the at least one first link 38 fits between the two second links 40A, 40B. In this way, the first link 38 is nested between the second links 40A, 40B, which facilitates storage of the linkage arrangement 36 when the first section 32 is in the first position.

In order to move the first section 32 to the second position, a user may grasp the first section 32 and rotate the first section 32 in a clockwise direction (relative to the orientation of FIGS. 3 and 4) such that the first section 32 is raised and displaced rearward relative to the second section 34. After such movement, the first section 32 is adjacent a tire 50 of the vehicle 10. In this example, the tire 50 is a rear tire of the vehicle 10. In order to ensure alignment with the tire 50, rotation of the first section 32 may be limited by a detent 52, which in this example is a surface of the second section 34 rearward of the second links 40A, 40B, in this example. A detent 52 is not required in all examples.

In this example, the first section 32 is supported in the second position by the rear tire 50. In particular, the first section 32 includes a support assembly 54, which is shown in FIG. 5, configured to support the first section 32 relative to the tire 50 when the first section 32 is in the second position. In this example, the support assembly 54 is configured to engage the tire 50 to prevent further rotation of the first section 32 beyond the second position. In other words, when the first section 32 is in the second position, the support assembly 54 prevents further displacement in the "rearward" and "lower" directions.

The support assembly 54 contacts the tire 50 in two locations in this example. A first location is a sidewall 56 of the tire 50, and a second location is a circumferentially outer wall 58 (i.e., the tread) of the tire 50. In this way, the support assembly 54 provides stability and adequately supports the weight of a user as the user steps onto the first section 32.

One example support assembly 54 will now be described in detail. In the example, the first section 32 includes a step 60 and a brace 62. The brace 62 is foldable relative to the step 60, as will be discussed below. When folded, as shown in FIG. 5, an inner surface 64 of the brace 62 engages the sidewall 56 of the tire 50. In this example, the inner surface 64 of the brace 62 directly contacts the sidewall 56, and prevents twisting and unwanted lateral movement (i.e., generally in and out of the page, relative to FIG. 5) of the first section 32. Further, the support assembly 54 includes a pin 66, which is slidable to engage the circumferentially outer wall 58 of the tire 50. In this example, the pin 66 directly contacts the circumferentially outer wall 58, and prevents rotation of the first section 32 beyond the second position (i.e., the pin 66 prevents additional counter-clockwise rotation, relative to FIG. 5).

Figure 6:
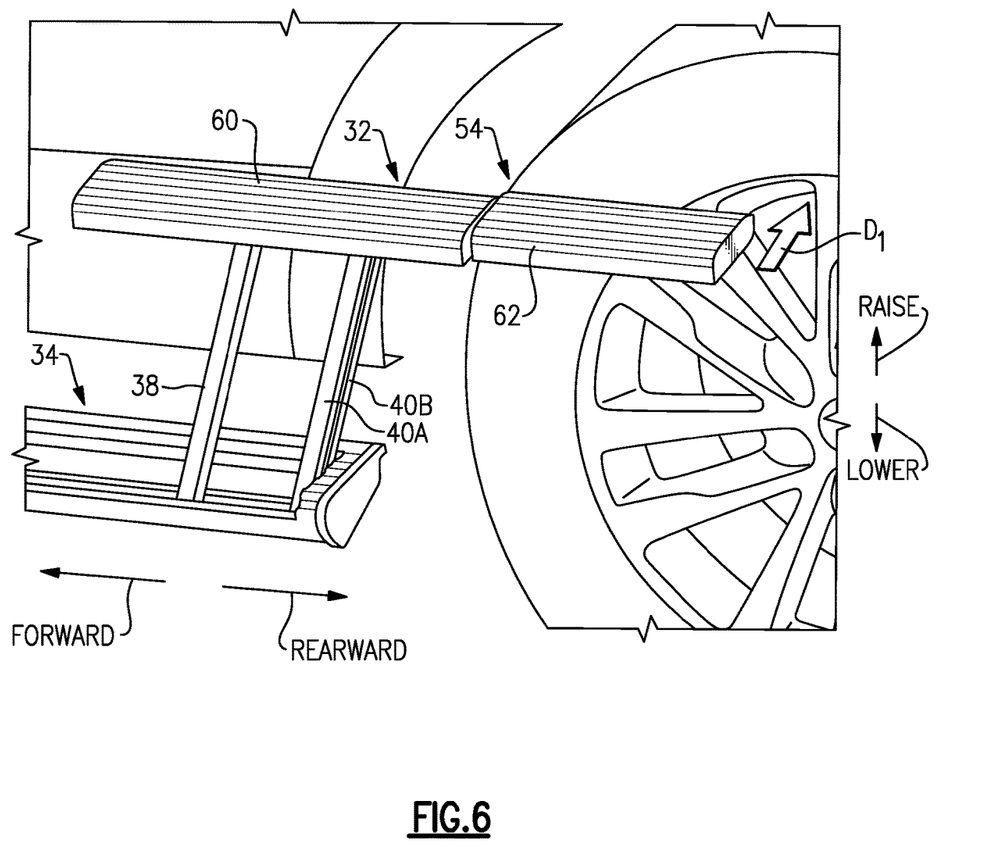
FIG. 6 illustrates the example running board assembly with the first section of the deck raised relative to the second section.
Figure 7:
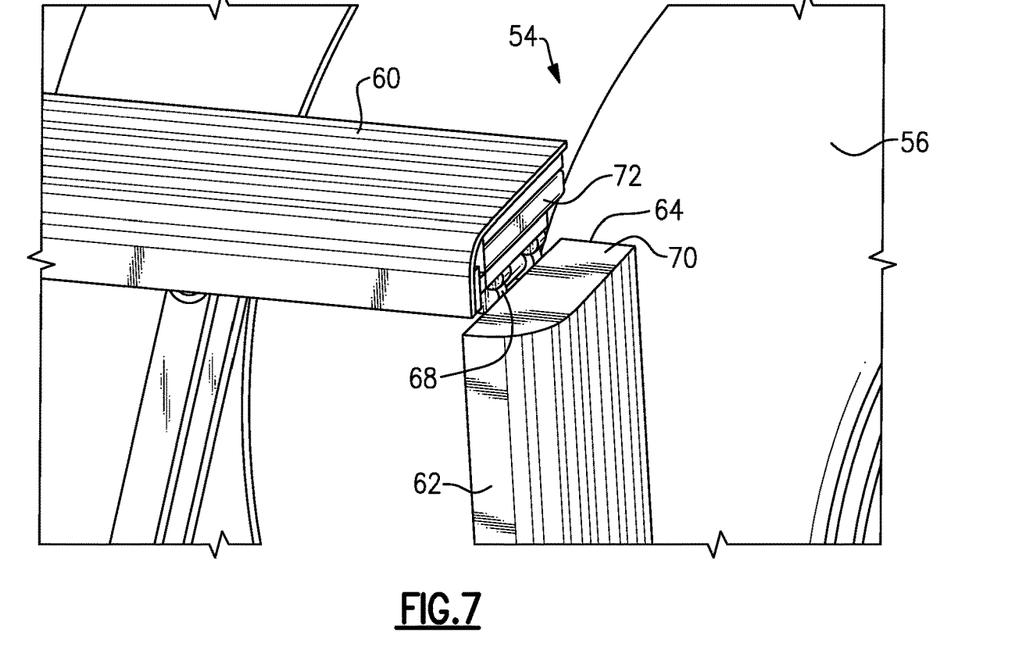
FIG. 7 illustrates a brace folded of the first section relative to a step of the first section.

Additional detail of the running board 14, support assembly 54, and a corresponding method of use will now be described relative to FIGS. 6-9. FIG. 6 illustrates the first section 32 in the second position. In FIG. 6, both the step 60 and the brace 62 lie in substantially the same vertical plane. In order to fold the brace 62 relative to the step 60, the brace 62 in this example is first displaced laterally toward the tire 50 in the direction $D_1$. The direction $D_1$ is normal to the "raise"/"lower" directions and the "forward"/"rearward" directions. After some relatively small amount of travel in the direction $D_1$, the brace 62 is free to fold relative to the step 60 about a hinge 68, seen in FIG. 5. As shown in FIG. 7, the brace 62 is rotated about 90° in the clockwise direction (relative to FIG. 7) from a horizontal position substantially parallel to the "forward"/"rearward" directions to a vertical position substantially parallel to the "raise"/"lower" directions. In this position, the inner surface 64 of the brace 62 contacts the sidewall 56 to provide stability to the first section 32 and, in particular, prevent twisting.

With the brace 62 folded to the vertical position, a side surface 70 of the brace 62 is brought out of contact with a handle 72 coupled to the pin 66. In this example, the handle 72 is rotatable about an axis A passing through a tab 74 of the pin 66. The axis A is substantially parallel to the "raise"/"lower" directions. A biasing member is configured to bias the handle 72 to the position of FIG. 8, in which the handle 72 is substantially normal to the pin 66. The biasing member may be a coil spring, for example, located within the step 60 or disposed about the axis A. This disclosure is not limited to any particular biasing member or the location of the same. This disclosure extends to other arrangements in which the handle 72 is essentially presented to the user automatically under the force of a biasing member after the brace 62 is folded. The disclosure also extends to assemblies in which the handle is manually moveable by a user without a spring.

Figure 8:
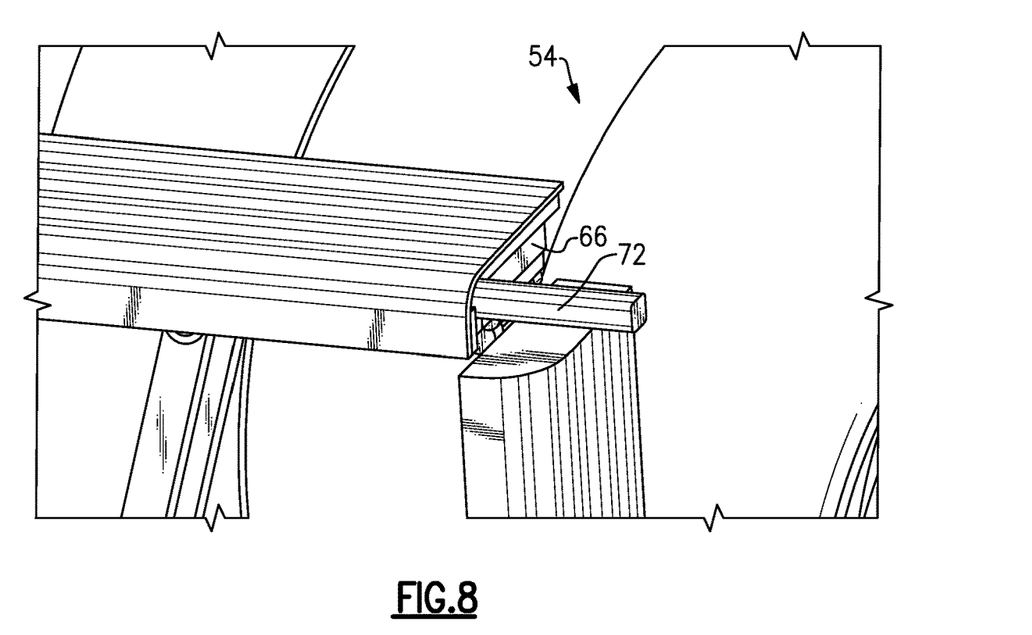
FIG. 8 illustrates a handle folding outward.
Figure 9:
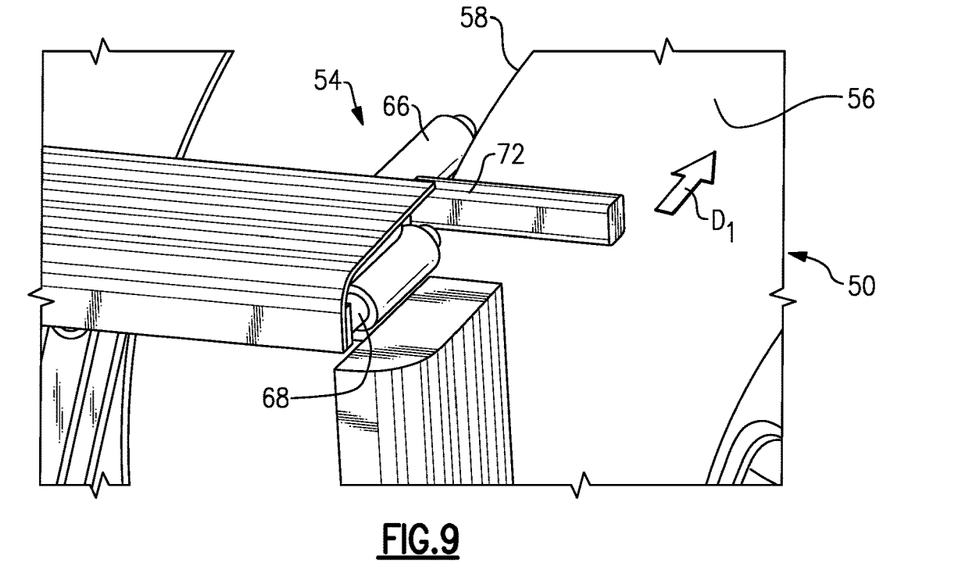
FIG. 9 illustrates the handle and a pin slid toward the tire.

In the position FIG. 8, a user may grasp the handle 72, which is coupled to the pin 66, and slide the handle 72 in the direction $D_1$ to the position of FIG. 9. In FIG. 9, the pin 66 has slid in the direction $D_1$ such that the pin 66 directly contacts the circumferentially outer wall 58. The handle 72 may also contact the sidewall 56 to provide additional support.

The support assembly 54 adequately supports the weight of a user on the tire 50 while also providing increased stability. While one example support assembly 54 has been described, this disclosure extends to other types of support assemblies. The disclosed support assembly 54, however, has the advantage of being integrated into the running board 14, which reduces the likelihood that the components are lost or stolen.

Figure 10:
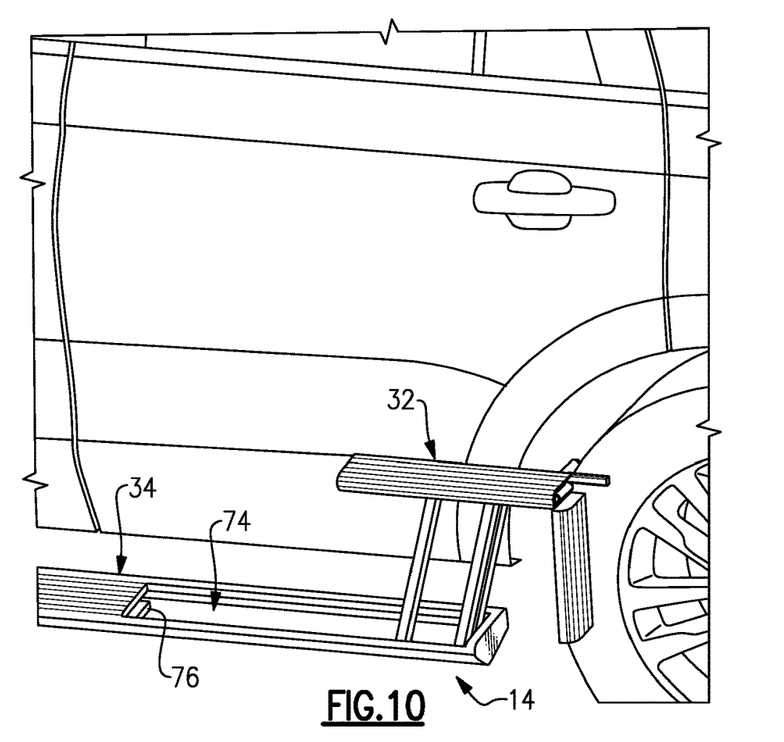
FIG. 10 illustrates the assistance step in a stored position.
Figure 11:
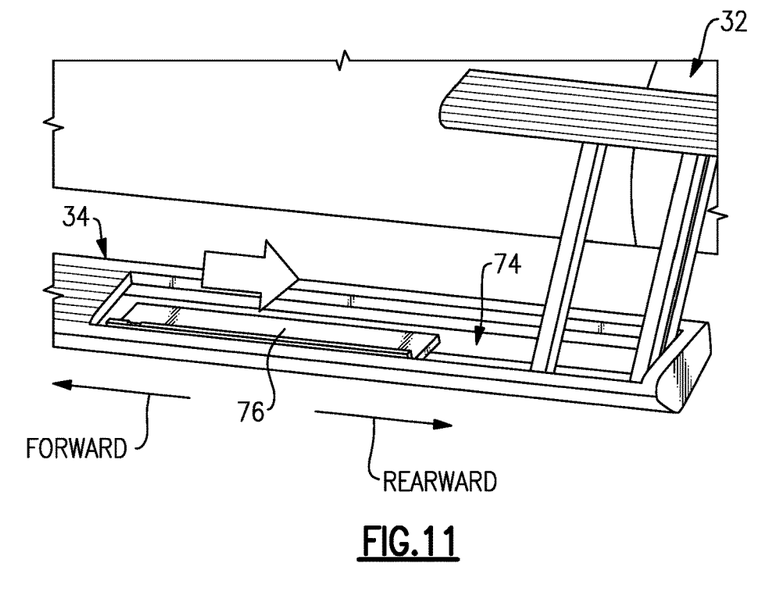
FIG. 11 illustrates the assistance step in an intermediate position.
Figure 12:
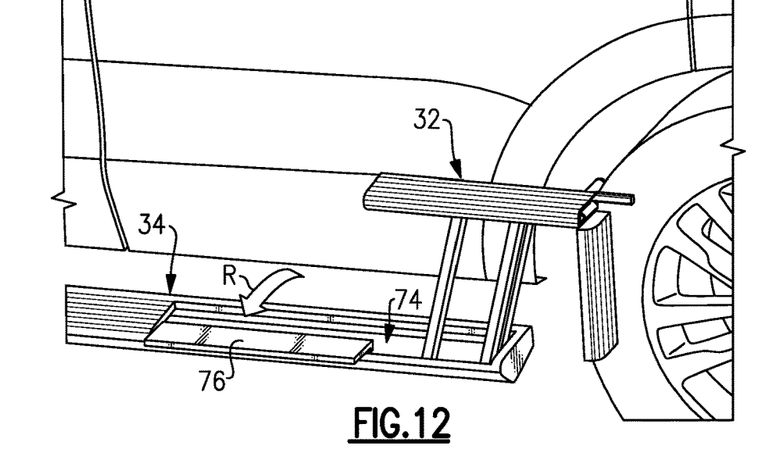
FIG. 12 illustrates the assistance step in a use position.

Because the first section 32 is moveable relative to second section 34, a cavity 74 is formed in the second section 34 when the first section 32 is in the second position, as shown in FIG. 10. This disclosure provides a selectively deployable assistance step 76, which supports a user and may provide assistance to a user attempting to step onto the first section 32. The assistance step 76 is optional and is not required in all examples. FIGS. 10-12 illustrate an example method and sequence for deploying the assistance step 76.

With reference to FIG. 10, which shows the assistance step 76 in a stored position, the assistance step 76 is substantially beneath the deck 26. A rear end of the assistance step 76 may be reachable by a user when the cavity 74 is exposed. A user may grasp the assistance step 76 and slide it in the "rearward" direction along the cavity 74. To this end, the second section 34 may include a track configured to guide the assistance step 76 in the "rearward" direction to the position of FIG. 11. In the position of FIG. 11, which is an intermediate position, the entire assistance step 76 is exposed the cavity 74, and the deck 26 does not cover assistance step. In this position, a user may rotate the assistance step 76 to a use position by rotating the assistance step 76 toward the user in the direction R, as shown in FIG. 12. To this end, the same track that guided the assistance step 76 in the "rearward" direction may also allow for rotational movement of the assistance step 76. In the use position of FIG. 12, an upper surface of the assistance step 76 is in a horizontal position substantially parallel to a ground surface and is configured to support a user as they step onto the assistance step 76.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for a motor vehicle, comprising: a running board, the running board including a deck including a first section and a second section, wherein the first section is configured to move between a first position in which the first section is substantially flush with the second section, and a second position in which the first section is raised relative to the second section, wherein the first section is configured to rotate between the first position and the second position.

2. The assembly as recited in claim 1, wherein, when in the second position, the first section is both raised and displaced rearward relative to the first section.

3. The assembly as recited in claim 1, wherein the first section is coupled to the second section by way of at least one link.

4. The assembly as recited in claim 3, wherein: the first section is coupled to the first section by way of at least one first link and at least one second link spaced apart from the at least one first link along a length of the running board, and the at least one first link and the at least one second link are rotatably connected to the first and second sections.

5. The assembly as recited in claim 4, wherein the at least one second link includes two links spaced-apart from one another in a direction normal to the length of the running board such that, when the first section is in the first position, the at least one first link is nested between the two second links.

6. The assembly as recited in claim 1, wherein the first section includes a support assembly configured to support the first section in the second position.

7. A running board for a motor vehicle, comprising:
a deck including a first section and a second section, wherein the first section is configured to move between a first position in which the first section is substantially flush with the second section, and a second position in which the first section is raised relative to the second section;
wherein the first section includes a support assembly configured to support the first section in the second position, and
wherein, when the first section is in the second position, the support assembly is selectively deployable to engage a tire of the motor vehicle.

8. The running board as recited in claim 7, wherein:
the first section includes a step and a brace configured to fold relative to the step, and
when folded, the brace is configured to engage a sidewall of the tire.

9. The running board as recited in claim 8, wherein the first section includes a pin slidable to engage a circumferentially outer wall of the tire.

10. The running board as recited in claim 9, wherein the pin is accessible when the brace is folded.

11. The running board as recited in claim 10, wherein, when the brace is folded, a handle coupled to the pin projects from the step.

12. The assembly as recited in claim 1, wherein:
a cavity formed in the running board receives the first section when the first section is in the first position, and
an assistance step is selectively deployable out of the cavity to provide a step adjacent the cavity.

13. The assembly as recited in claim 12, wherein:
the assistance step is slidable between a storage position and an intermediate position, and
the assistance step is rotatable from the intermediate position to a use position.

14. A method, comprising:
raising a first section of a deck of a running board relative to a second section of the deck, wherein the raising step includes moving the first section from a first position in which the first section is substantially flush with the second section, to a second position in which the first section is raised relative to the second section, wherein the raising step further includes rotating the first section, such that the first section is displaced both vertically and rearward during the raising step.

15. The method as recited in claim 14, wherein:
the running board is moveable between a retracted position, a first deployed position, and a second deployed position,
the running board is displaced further from a body of a vehicle in the second deployed position than in the first deployed position, and
the raising step is performed when the running board is in the second deployed position.

16. The method as recited in claim 14, further comprising:
supporting the first section in the second position by engaging a tire of a vehicle.

17. The method as recited in claim 16, further comprising:
folding a brace of the first section, the brace engaging a side wall of the tire,
deploying a pin upon folding the brace, and
sliding the pin to engage a circumferentially outer surface of the tire.

18. The method as recited in claim 14, further comprising:
deploying an assistance step out of a cavity formed in the running board when the first section is in the second position.

* * * * *